United States Patent
Gezarzick et al.

(10) Patent No.: US 6,259,076 B1
(45) Date of Patent: Jul. 10, 2001

(54) METHOD FOR HARDENING CAMSHAFTS AND LINEAR INDUCTOR FOR THE IMPLEMENTATION OF SAID METHOD

(75) Inventors: Waldemar Gezarzick; Hans-Jürgen Leisner, both of Remscheid; Peter Schulte, Wuppertal, all of (DE)

(73) Assignee: Elotherm GmbH, Remscheid (DE)

( * ) Notice: Subject to any disclaimer, the term of this patent is extended or adjusted under 35 U.S.C. 154(b) by 0 days.

(21) Appl. No.: 09/355,888

(22) PCT Filed: Jan. 20, 1998

(86) PCT No.: PCT/EP98/00287
§ 371 Date: Sep. 29, 1999
§ 102(e) Date: Sep. 29, 1999

(87) PCT Pub. No.: WO98/35066
PCT Pub. Date: Aug. 13, 1998

(30) Foreign Application Priority Data

Feb. 6, 1997 (DE) .............................................. 197 04 438

(51) Int. Cl.[7] ................................ C21D 9/30; C21D 1/10
(52) U.S. Cl. ........................ 219/639; 219/661; 148/573; 148/526; 29/888.1
(58) Field of Search ................................... 219/639, 640, 219/652, 677, 661; 266/129; 148/526, 572–573, 574, 575; 29/888.1

(56) References Cited

U.S. PATENT DOCUMENTS

| | | | |
|---|---|---|---|
| 2,400,472 | * 5/1946 | Strickland, Jr. | 219/667 |
| 2,444,259 | * 6/1948 | Jordan | 219/639 |
| 2,590,546 | * 3/1952 | Kincaid et al. | 219/639 |
| 2,689,900 | * 9/1954 | Redmond et al. | 219/639 |
| 3,008,025 | * 11/1961 | Alf | 219/652 |
| 3,824,367 | 7/1974 | Balzer et al. . | |
| 4,109,127 | * 8/1978 | Frungel | 219/635 |
| 4,222,799 | * 9/1980 | Hijikata et al. | 148/568 |
| 4,604,510 | * 8/1986 | Laughlin et al. | 266/127 |
| 4,639,279 | * 1/1987 | Chatterjee | 148/573 |
| 4,675,488 | 6/1987 | Mucha et al. . | |
| 5,737,975 | * 4/1998 | Hanisch et al. | 74/567 |

FOREIGN PATENT DOCUMENTS

| | | |
|---|---|---|
| 75 27 498 | 7/1981 | (DE) . |
| 40 21 025 | 9/1991 | (DE) . |
| 2-66123 | * 3/1990 | (JP) . |
| 2-197517 | 8/1990 | (JP) . |
| 5-222458 | * 8/1993 | (JP) . |
| 1620493 | * 1/1991 | (SU) ................................... 148/526 |

OTHER PUBLICATIONS

"Induktionshärtetechnik für Nockenwellen von Verbrennungsmotoren," F.H. Reinke, *Elektrowarme International*, Edition B, vol. 33 No. 3, Jun., 1975, pp. b146–b160.

\* cited by examiner

Primary Examiner—John A. Jeffery
(74) Attorney, Agent, or Firm—Proskauer Rose LLP

(57) ABSTRACT

A method for simultaneously hardening a group of cams on a camshaft comprises first heating the group of cams at low power for at least one heating interval, then pausing the heating for a pause interval during which no power is applied to the group of cams, and then subsequently heating the group of cams at high power for one heating interval. The pause intervals, during which no power is applied to the group of cams, are sufficient as to allow heat stored in the cams to distribute uniformly throughout the cams. Each group of cams is hardened by a linear inductor and the regions of the camshafts that are not to be hardened are shielded by a cooling device.

8 Claims, 3 Drawing Sheets

METHOD FOR HARDENING CAMSHAFTS AND LINEAR INDUCTOR FOR THE IMPLEMENTATION OF SAID METHOD

BACKGROUND OF THE INVENTION

The invention relates to a method for the hardening of camshafts wherein the cams of the camshaft are hardened simultaneously in groups while the camshaft is rotating, and wherein during the inductively performed heating of a group the zone of the camshaft that is not to be hardened and bordering on the group concerned is shielded from heating by means of a cooling device. In addition, the invention relates to a linear inductor intended to perform the method.

A basic problem in the hardening of closely proximate hardening zones of a camshaft is that the heating of an individual cam can cause the supplementary tempering of the previously hardened and directly proximate cam. When hardening is being performed individually, therefore, it is necessary to shield the cams bordering on the cam being treated. The requisite expenditure on apparatus for this purpose is substantial. Moreover, the hardening of cams individually implies a considerable duration in the processing time required for the hardening of a shaft.

For the purpose of shortening the processing time and eliminating the problem of the additional tempering of previously hardened and directly proximate cams, it has been proposed in the special issue of "elektrowärme international", number 3/75, "Induktionshärtetechnik für Nockenwellen von Verbrennungsmotoren [induction-hardening technique for camshafts of combustion engines]" that the cams of a camshaft be combined into groups and that the cams of one of these groups at a time be hardened simultaneously. The size of the group and the length of the group are determined by the distance to those zones of the camshaft that should not undergo any hardening. This process permitted a substantial shortening in the processing time required for the hardening of a camshaft. Furthermore, due to the simultaneously effected heating of the closely proximate cams, the problem of the supplementary tempering of previously hardened cams no longer exists.

The requisite expenditure on apparatus for the simultaneous hardening of a group is still substantial even with the process explained above, since an individual inductor, riding as a rule on the cam involved, is used for each cam. For the purpose of reducing this technical expenditure, it has been proposed that the camshaft be hardened by means of a linear inductor extending along the camshaft and positioned in the area of the envelope curve of the camshaft (DE-GM 75 27 498). It has turned out, however, that the use of such a fixed inductor, because of the varying coupling distances in a camshaft rotation, causes overheating of the tips of the cams or insufficient heating of the other sections of the cam being processed.

On the basis of the state of the art explained above, the task of the invention is to provide an economically practicable process for the hardening of camshafts and a particularly suitable inductor for performing the process.

SUMMARY OF THE INVENTION

This task is resolved by the invention in that the groups of cams that are to be hardened are simultaneously hardened by means of one linear inductor each, that the heating of the cams is performed first in a time interval at low power and then in a time interval at high power, and that the intervals are respectively separated from each other by a pause interval during which no power is applied.

In accordance with the invention, it is proposed that not only the cams of an individual group of cams of a camshaft be hardened simultaneously but that the hardening of all cam groups of a shaft be undertaken simultaneously. In this way the processing time and thus by implication the cost involved in the hardening is already reduced. Furthermore, in accordance with the invention, the heating of the cams takes place over at least one time segment at relatively low electrical power. The heat applied in this way lies below the critical limit occasioned by the material characteristics of the cams being processed. During the pause interval, the heat thus applied is distributed so that the heat stored in the cams before the last stage of the heating process is uniformly distributed. Only after this, in order to conclude the heating, is such a high quantity of energy applied that the required surface hardening is achieved by means of the quenching that then occurs. The risk of damage to the cam due to overheating is minimal because of the previously effected uniform heating of the cams. This also applies to the tips of the cams, in which the highest temperature occurs due to the small distance at which they are moved along the heating conductors. This makes it possible to carry out the heating using economical linear inductors.

The number of time intervals in which initially only a low power is applied can be suited to the structural features of the camshaft being processed at a given time. In practical trials of the process of the invention, good working results were obtained when initially two time intervals at low power, separated by a pause interval, were gone through. The repeated interruption of the heating process achieved a gentle and particularly uniform heating of the cams, due to the fact that, between heatings, there was equalization of any non-uniform heat distribution that might have occurred during the applications of power.

A preferred form of the method of the invention is characterized in that the duration of the time intervals and pause intervals decreases from the first to the last interval. This measure, too, favorably affects the uniformity of heat distribution in the cams being processed.

Preferably, the power applied in the last time interval should be twice as great as that applied during the time interval at low power. Similarly, it is-expedient to apply the low power at a different frequency from that of the high power. In this way, the introduction of heat into the work piece can be purposefully controlled. It has turned out in practical experiments that it is advantageous to work at a low frequency, i.e. with a large depth of penetration, during the introduction of the low power and at a high frequency during the concluding interval with the introduction of the high power, so that heating takes place only in those layers of the cam bordering on the surface.

Regarding the practicability of the process of the invention, it is advantageous if the camshafts are arranged essentially horizontally during the performance of the process. In this way, for instance, the cooling of those sections of the camshaft that are not to be hardened is simplified during the heating of the groups of cams that are to be hardened.

Depending on the domain of application and the nature of the camshaft to be processed, it may be expedient to carry out the quenching that follows the heating of the camshaft during a time interval whose duration is shortened in such a way that a residual heat is retained following the quenching. In this way, the residual heat that still exists in the camshaft following the quenching that is thus performed can be used for the tempering of the camshaft, so that a frequently undesired full hardening of the shafts can be safely prevented.

A linear inductor particularly suitable for performing the method of the invention is one having at least two heating conductors extending axially parallel with the camshaft, positioned in the area of the envelope curve of the group of cams, and separated from each other by an angular distance of not more than 180° relative to the axis of rotation of the camshaft, whereby the length of the heating-conductor arms corresponds to the distance between the extreme ends of the respective group of cams, and that each of the heating conductors is formed as a heating-conductor loop with two heating-conductor arms extending axially parallel with the camshaft, the first arm being displaced by an angle of less than 90° relative to the second arm with respect to the axis of rotation of the camshaft.

With its conductor arms, the linear inductor of the invention encompasses at most half of the cylindrical area traversed during a rotation of the cams. In this way, the tips in particular of the individual cams are exposed to large inductive heating only over a fraction of their travel during a rotation of the shaft. During the section in which no direct encounter takes place with a conductor arm of the inductor, the heat previously induced in the tip of the camshaft can penetrate into those areas in which the cam displays greater mass. Thus, an additional improvement in the uniformity of heat distribution within the cam is simply achieved.

BRIEF DESCRIPTION OF THE DRAWINGS

The invention is described in more detail below with the aid of a drawing representing a specimen model. The figures show the following.

DETAILED DESCRIPTION OF THE INVENTION

Figure 1:
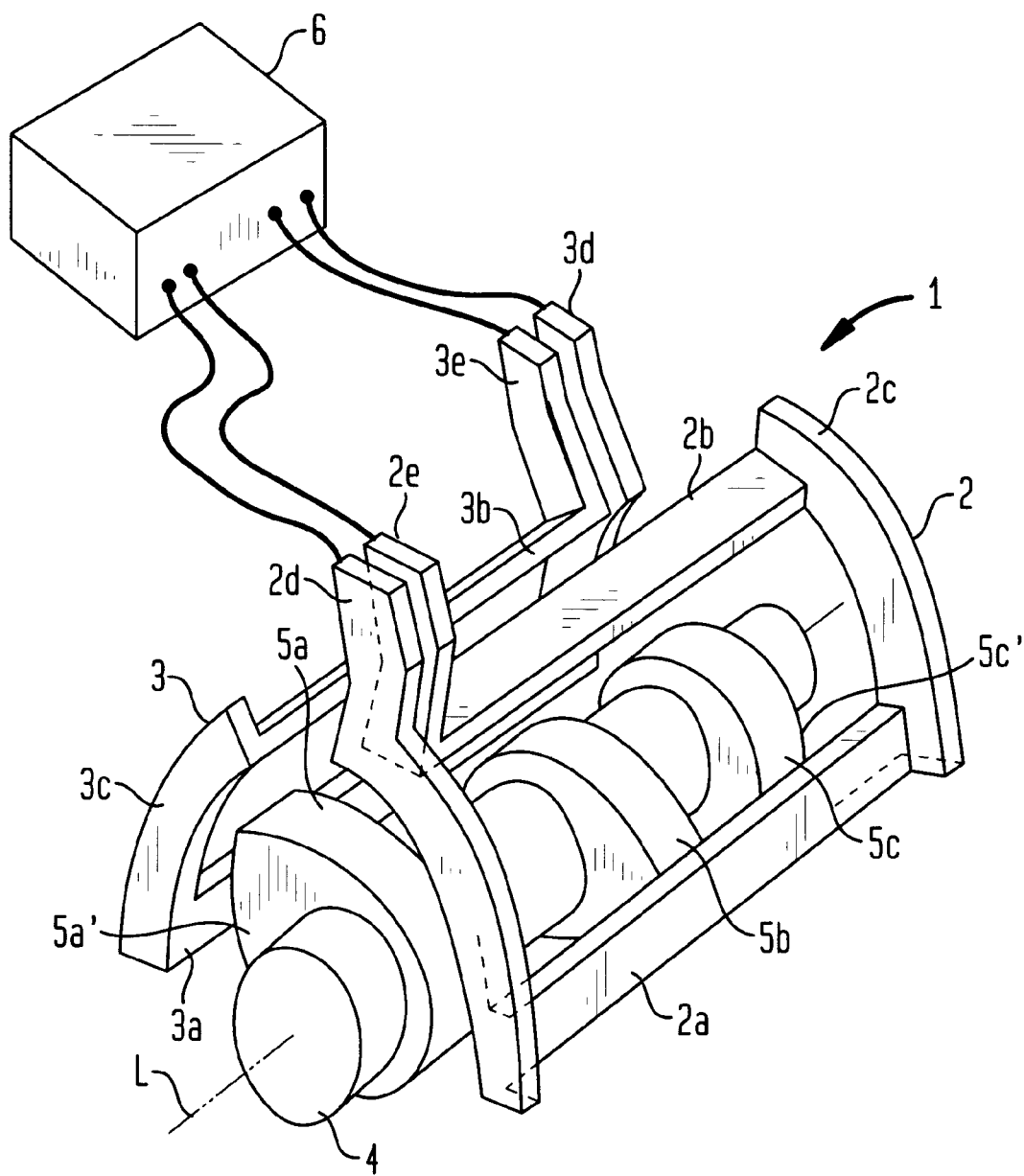
FIG. 1 a camshaft, with linear inductor mounted thereon, in sectional, schematic and perspective views.
Figure 2:
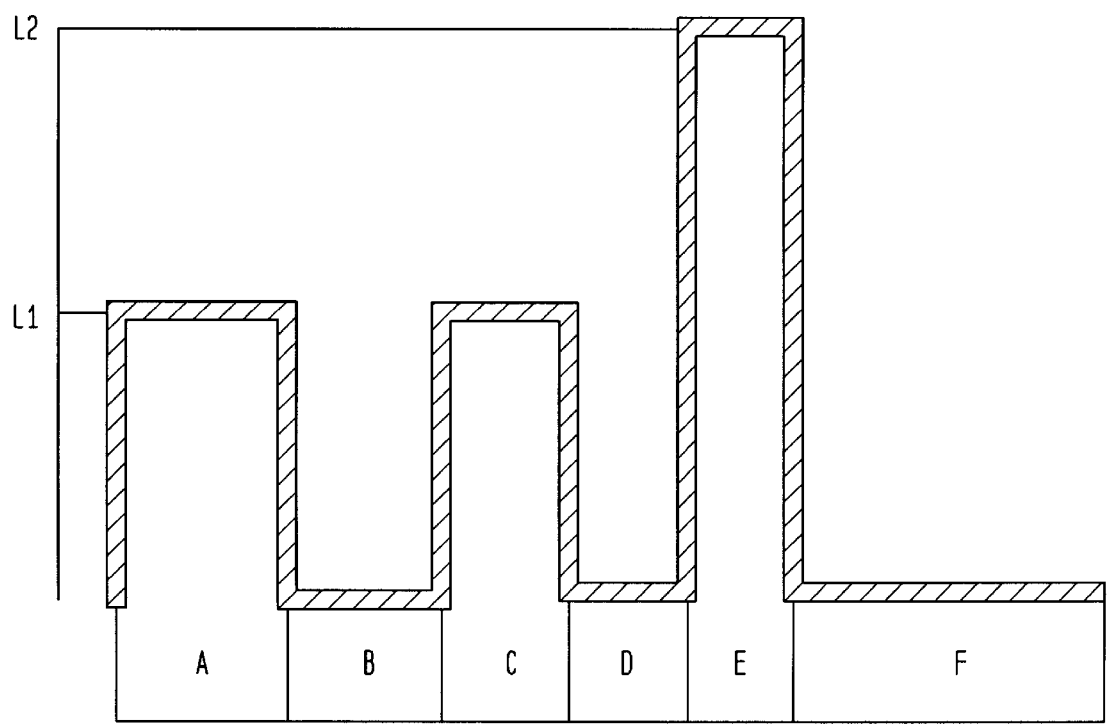
FIG. 2 a sequence of time intervals gone through during the heating and quenching of the camshaft shown in FIG. 1.

The linear inductor 1 displays two heating conductors 2, 3 formed as heating-conductor loops, each comprising a first heating-conductor arm 2a, 3a and a second heating-conductor arm 2b, 3b. The heating-conductor arms 2a, 2b, 3a, 3b extend coaxially with the longitudinal axis L of the camshaft 4, whereby the first heating-conductor arms 2a, 3a lie opposite each other while the second heating-conductor arms 2b, 3b, also extending coaxially with the camshaft, are respectively positioned in close proximity to each other and, relative to the longitudinal axis of the camshaft 4, are displaced from the respective first heating-conductor arms 2a, 3a by an angular amount of less than 90°. The heating-conductor arms 2a, 2b, 3a, 3b of the heating conductors 2, 3 are connected to each other via a connecting arm 2c, 3c and to a service and control device 6, via a supply line 2d, 3d and a return line 2e, 3e. The respective connecting arm 2c, 3c and the section of the supply line 2d or 3d assigned to the respective heating conductor 2, 3 are curved in a circular arc so that the angular domain encompassed is less than 90°. In this way, the heating conductors 2, 3 of the inductor 1 encompass the cylindrical area traversed by the camshaft by not more than 180°.

The camshaft 4 shown in section in FIG. 1 displays, among other things, a group 5 of three cams 5a, 5b, 5c. Those sections of the camshaft 4 bordering on the outer cams 5a, 5c should not undergo any hardening and are therefore shielded by means of commercially available cooling devices, not shown, against the transfer of heat during the heating of the group 5 of cams 5a, 5b, 5c. The length of the heating-conductor arms 2a, 2b, 3a, 3b corresponds with the distance between the faces 5a', 5c'= of the respective outer cams 5a, 5c of the group 5 of cams 5a–5c. The heating-conductor arms 2a, 2b, 3a, 3b are fitted with plates, not shown, in the area of the cams 5a, 5b, 5c for the purpose of introducing electrical power.

Figure 3:
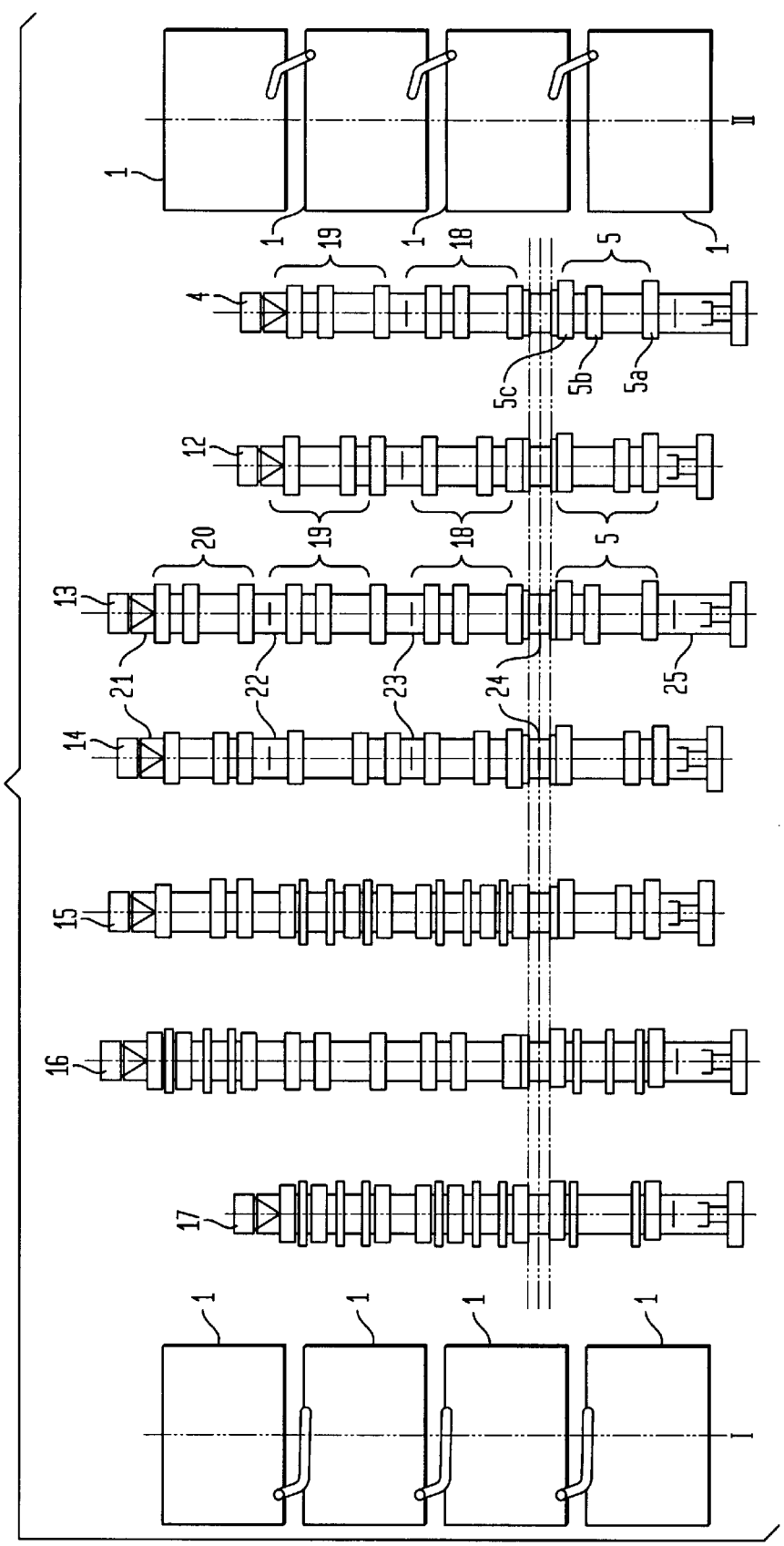
FIG. 3 a device for the hardening of camshafts in schematic view.

The device shown in FIG. 3 displays two stations I, II at which camshafts 4, 12–17 can be hardened. Each of the stations I, II is fitted with four inductors 1 of the kind explained above.

The camshafts 4, 12–17 display up to four groups 5, 18, 19, 20 of cams that can be simultaneously hardened in the stations I, II. Between the respective groups 5, 18, 19, 20, the shafts 4, 12–17 display bearing sections 21, 22, 23, 24, 25 that are to remain unhardened.

After the insertion of one of the camshafts 4, 12–17, the inductors 1 are lowered. A relatively low electrical power L1 is then applied at a low frequency to the respective rotating camshaft during a first time interval A. While the tips of the cams 5a, 5b, 5c are situated in the area of the heating conductors 2, 3, the strongest heating takes place in their area. In the area not encompassed by the heating conductors 2, 3, there is migration of heat into those areas of the cams 5a, 5b, 5c in which the latter display greater mass.

After the expiry of the first time interval A, the supply of energy is interrupted during a pause interval B. The pause interval B is shorter than the first time interval A. The groups 5, 18, 19, 20 are then again heated with the same power L1 and at the same frequency during a time interval C that is further shortened in comparison with the pause interval B. After a second pause interval D without the supply of energy and further shortened in comparison with the time interval C, heating takes place with double the power, L2, and at high frequency during the last, shortest time segment E. In this interval, essentially, the surface that is to be hardened is raised to the temperature required for an optimal hardening result. After conclusion of the heating, the quenching of the cams 5a, 5b, 5c of the groups 5, 18, 19, 20 takes place over a certain time interval F.

What is claimed is:

1. A method for simultaneously hardening a group of cams on a camshaft wherein a linear inductor heats the group of cams and wherein regions of the camshaft which are not to be hardened are shielded by a cooling device, the method comprising the steps of:

heating the group of cams at low power during at least a first heating interval, pausing the heating for a pause interval during which no power is applied to the group of cams, the pause interval being sufficient so that heat stored in the cams is distributed uniformly throughout the cams, and resuming heating of the group of cams at high power during a second heating interval, wherein the duration of the heating intervals and the pause intervals decreases progressively.

2. The method of claim 1 wherein during the step of heating at low power, heating is conducted in two time intervals, separated by a pause interval.

3. The method of claim 2 wherein the duration of the heating intervals and the pause intervals decreases progressively.

4. The method of claim 1 wherein the power applied during the second heating step is at least twice the power applied during the first heating step.

5. The method of claim 1 wherein the power applied during the step of heating at low power has a lower frequency than the power applied during the step of heating at high power.

6. The method of claim 1 wherein the camshafts are arranged essentially horizontally.

7. The method of claim 1 further comprises the step of quenching the cams after the second heating step for a time interval such that residual heat is retained in the cams following quenching.

8. A linear inductor for hardening a group of cams on a camshaft which comprises at least two heating conductors, which extend axially parallel to the camshaft, and are positioned in an area that envelop the group of cams to be hardened, the at least two heating conductors being separated from each other by an angular distance of no more than 180° relative an axis of rotation of the camshaft, wherein the length of the heating conductors corresponds to the distance between the ends of the groups of cams to be hardened, and wherein each heating conductor comprising a heating conductor loop comprising first and second heating conductor arms which extend axially parallel to the camshaft, the first heating conductor arm being displaced by an angle less than 90° relative to the second heating conductor arm with respect to the axis of rotation of the camshaft.

* * * * *